A. G. LOECK.
HANGER APPARATUS FOR BLOWER PIPES WHEN FILLING SILOS.
APPLICATION FILED MAY 20, 1921.

1,400,753.

Patented Dec. 20, 1921.

Inventor
Arthur G. Loeck,
By Watson E. Coleman
Attorney

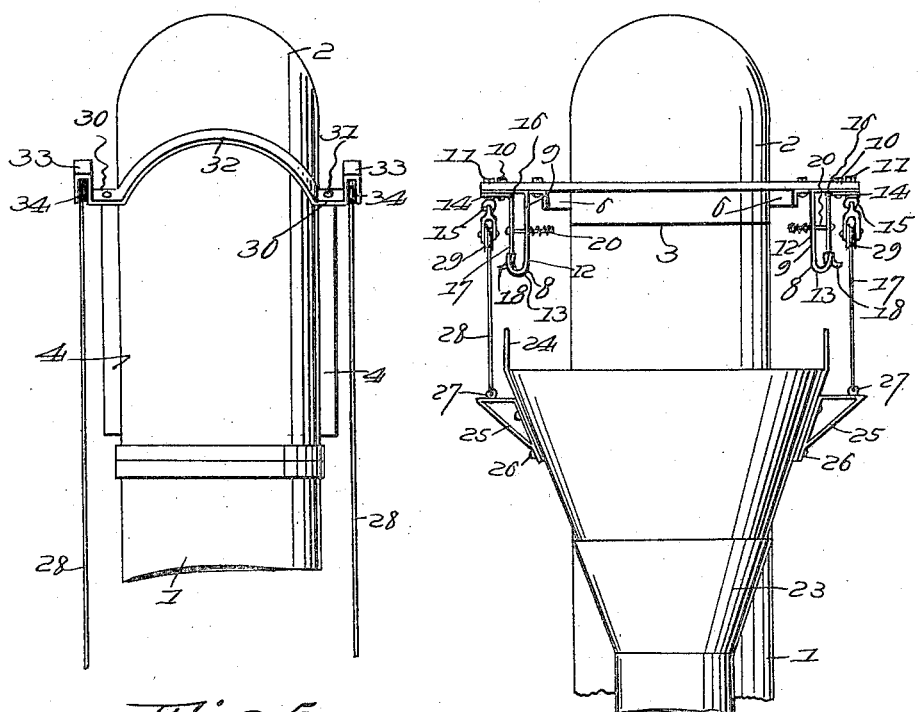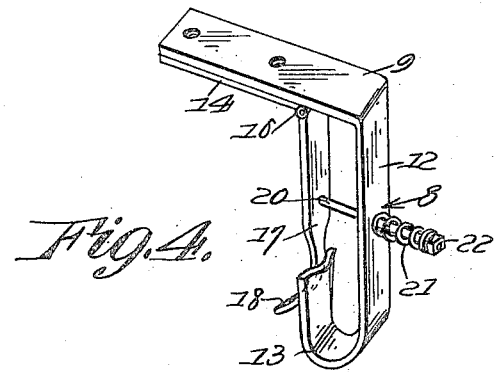

UNITED STATES PATENT OFFICE.

ARTHUR G. LOECK, OF CAMPBELLSPORT, WISCONSIN.

HANGER APPARATUS FOR BLOWER-PIPES WHEN FILLING SILOS.

1,400,753.  Specification of Letters Patent.  Patented Dec. 20, 1921.

Application filed May 20, 1921. Serial No. 471,286.

*To all whom it may concern:*

Be it known that I, ARTHUR G. LOECK, a citizen of the United States, residing at Campbellsport, in the county of Fond du Lac and State of Wisconsin, have invented certain new and useful Improvements in Hanger Apparatus for Blower-Pipes when Filling Silos, of which the following is a specification, reference being had to the accompanying drawings.

Heretofore, considerable difficulty arises when suspending a distributer upon a blower for filling silos, due to the necessity of climbing up the silo to attach the distributer. This is a very tedious job, and very often may result in the operator slipping and falling, and possibly resulting in serious injuries.

However, the present invention has for its purpose the provision of means, by which an operator remaining upon the ground may impart a pulling action to suitable loops or cables, hoisting the distributer and causing the same to automatically attach to the blower, thereby avoiding climbing the silo.

Another purpose consists in the provision of a hanger including snap hooks of a particular character, whereby when the distributer is hoisted with its upper end adjacent the blower, the loops on the distributer will automatically engage the snap hooks, and thereby be held in position, to receive the grain for distributing the same or other material in the silo.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts as will be hereinafter set forth, shown in the drawings and claimed.

In the drawings:—

Fig. 3 is a view in side elevation at right angles to that shown in Fig. 1, also showing the distributer in the act of being attached.

Fig. 4 is an enlarged detail view of the snap fastener for supporting the loops of the distributer.

Fig. 5 is a view in elevation just the opposite to that shown in Fig. 3, showing the arrangement of the metallic strap 32 and its connection with the brackets 3.

Figure 1:
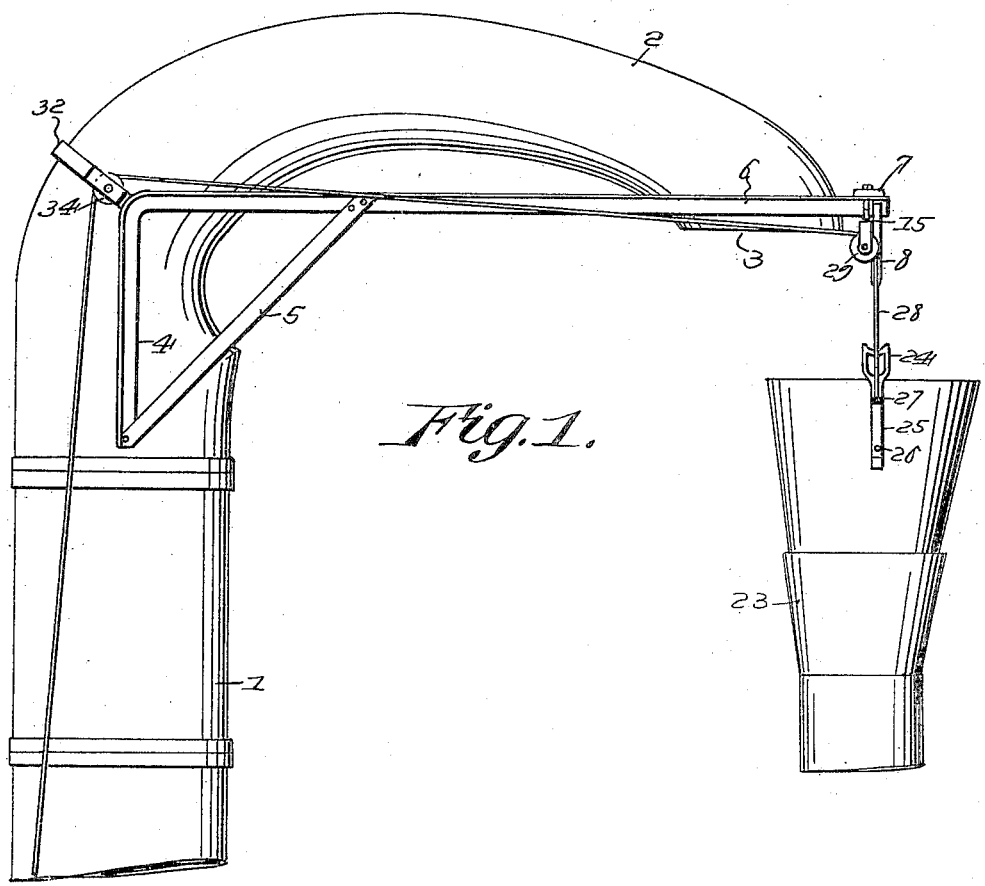
Figure 1 is a view in side elevation of the upper part of a blower, showing the application of the improved hanger for the distributer, and constructed in accordance with the invention.
Figure 2:
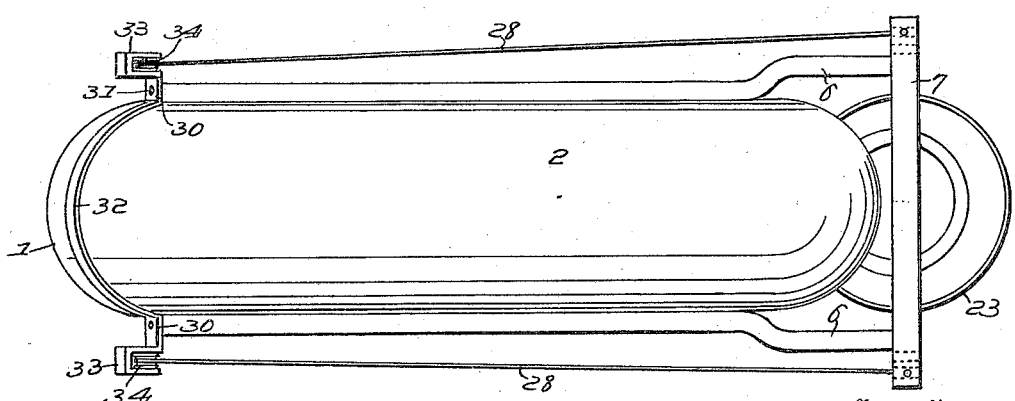
Fig. 2 is a plan view of the same.

Referring to the drawings, 1 designates the blower, which is provided with an overhanging discharge pipe 2 provided with an outlet 3. Connected to the upper part of the blower, preferably adjacent the discharge spout or elbow, by means of welding, or in any other suitable manner are metallic angle brackets 4, there being braces 5 for reinforcing the right angle parts of the brackets. Obviously the drawing shows two brackets, one on each side, each being angular in cross section. Connecting the extremities of offset portions 6 of said brackets is a transverse metallic bar 7.

The ends of the bar 7 carry fasteners 8 of the snap type. Each fastener comprises an angle piece 9 fastened to the bar 7 by means of the bolts 10 and 11. A depending part 12 of each angle piece or plate at its lower end terminates in an upturned hook 13. A plate 14 is fastened to the horizontal part of the angle piece or plate 9 and to the bar 7 by means of the bolt 11, one end of which has an eye 15. Hingedly connected to the plate 14 as at 16 is a retaining plate 17, which assumes a position normally in parallelism with the depending part 12 of the angle piece or plate 9. The retaining plate 17 overlies the terminal of the upturned hook 13, and its lower end terminates in a lateral curved portion 18, which acts to guide a member to be engaged with the hook, between the hook and the plate 17.

Connected to the plate 17 is a bolt 20, which passes through the depending part 12 of the plate, and has a coiled spring 21 in surrounding relation thereto, and by means of an adjusting nut 22 on the end of the bolt 20 the tension of the spring 21 may be regulated so as to increase or decrease the pressure of the plate 17 upon the upturned hook 13.

A distributer designated by the numeral 23 is illustrated, and is disposed in a position ready to be suspended by the fasteners, therefore at diametrically opposite portions of the upper edge of the distributer loops 24 are attached. These loops are disposed in positions, so that when the distributer is hoisted, they will automatically be guided between the curved portions 18 of the plates 17 of both fasteners, which are carried by the bar 7. The loops 24 automatically separate the lower portions of the plates 17 from the terminals of the hooks 13, allowing the loops to engage the hooks. The springs 21 act to draw the plates 17 closely in contact with the terminals of the hooks 13, after the loops have separated the plates and engaged with the hooks.

Suitable brackets 25 are connected to the diametrically opposite sides of the distributer as at 26, and connected to the brackets are eyes 27, to which cables or ropes 28 are connected. The cables or ropes pass over pulleys 29, which are suspended from the eyes 15.

Secured at 30 by means of bolts or the like, passing through the horizontal flanges of the angle brackets 4 are end portions 31 of a metallic strap 32. This metallic strap arches the discharge spout or elbow, approximately where it unites with the blower. This metallic strap has angular terminals 33, from which pulleys 34 are suspended. The cables or ropes 28 extend from the pulleys 29 and pass over the pulleys 34, and extend down along the side of the blower, and may be attached in any suitable manner thereto adjacent its lower portion, so that it may be in a position to be grasped by an operator. When it is desired to connect the distributer, the ropes or cables 28 are pulled, and when the upper end of the distributer approaches the discharge end of the spout, the loops 24 will pass between the ends of the plates 17 and the hooks 13, and automatically engage the hooks, thereby connecting the distributer to the spout, to receive the grain or other material, and distribute the same in the silo.

The invention having been set forth, what is claimed as being useful is:

1. In a hanger apparatus for the purpose indicated, the combination with a blower having a discharge spout, a frame supported thereon and comprising side angle brackets, a bar connecting the ends of said brackets, depending flanges carried by the lateral end of said bar and having spring tensioned movable plates, a distributer having diametrically opposite loops for separating the movable plates from the flanges so as to connect with the flanges, and cables operatively connecting with the distributer for hoisting the same for causing said loops to engage the fasteners.

2. The combination with a blower having a discharge spout, of a distributer in a position adjacent the outlet end of the discharge spout, brackets secured to the opposite sides of the spout, a transverse bar connecting the ends of the brackets, depending hooks carried by the ends of the bar, hingedly mounted plates mounted upon the bar and separably engaging the hooks, spring tensioned means for the suspended plates to hold them in contact with the hooks, loops upon diametrically opposite sides of the distributer, and means mounted upon the blower and its spout and being operatively connected to the distributer for hoisting the same, causing the loops to separate the plates from the hooks to engage therewith.

3. The combination with a blower provided with a discharge spout at its upper end, of a frame connected to the spout, a distributer having diametrically opposite loops, depending hooks carried by the end of the frame adjacent the discharge mouth of the spout, plates pivotally suspended from the end of the frame and separably engaging the terminals of the hooks, spring tensioned means connecting the plates and the vertical parts of the hooks, and means for hoisting the distributer, whereby the loops thereon may separate the plates from the hooks, to permit the loops to engage with the hooks.

4. The combination with a distributer provided with loops upon diametrically opposite portions of its upper end, of a blower having a discharge spout, a frame connected to said spout, hooks suspended from the end of the frame, plates hingedly mounted on the frame and separably engaging the hooks, means hingedly connected to the plates and having spring tensioned connections with the hooks for holding the plates yieldably and separably in contact with the hooks, and means for hoisting the distributer whereby the loops may pass between the hooks and the plates, and engage with said hooks.

In testimony whereof I hereunto affix my signature.

ARTHUR G. LOECK.